(12) United States Patent
Zimmerman et al.

(10) Patent No.: US 6,637,777 B2
(45) Date of Patent: Oct. 28, 2003

(54) LOW-PROFILE CONDUIT ELBOW

(75) Inventors: Phil Zimmerman, Hamilton, IN (US); Clyde Moore, Stuart, FL (US); Tom Hooper, Grand Rapids, MI (US)

(73) Assignee: Pent Products, Inc., Kendallville, IN (US)

( * ) Notice: Subject to any disclaimer, the term of this patent is extended or adjusted under 35 U.S.C. 154(b) by 0 days.

(21) Appl. No.: 10/091,015

(22) Filed: Mar. 5, 2002

(65) Prior Publication Data

US 2003/0168852 A1 Sep. 11, 2003

(51) Int. Cl.7 .................................................. F16L 43/00
(52) U.S. Cl. .................. 285/179.1; 285/907; 285/126.1; 285/305; 285/151.1
(58) Field of Search ................................ 285/921, 907, 285/125.1, 126.1, 151.1, 149.1, 179.1, 308, 309, 310, 305

(56) References Cited

U.S. PATENT DOCUMENTS

| 1,669,447 A | 5/1928 | Boyton et al. | |
| 1,887,192 A | 11/1932 | Betts, Jr. | |
| 1,914,011 A | 6/1933 | Eccles | |
| 2,357,755 A | 9/1944 | Moll | |
| 2,911,235 A | 11/1959 | Stumbough | |
| 2,955,851 A | 10/1960 | Scott | |
| 3,538,940 A | * 11/1970 | Graham | 285/125.1 |
| 4,289,335 A | * 9/1981 | Olbermann | 285/309 |
| 4,508,371 A | 4/1985 | Maier | |
| 5,016,924 A | 5/1991 | Lin | |
| 5,348,353 A | * 9/1994 | Deweerdt | 285/305 |
| 5,533,763 A | 7/1996 | Neuhof | |
| 6,250,691 B1 | * 6/2001 | Taylor et al. | 285/305 |

* cited by examiner

Primary Examiner—Lynne H. Browne
Assistant Examiner—Aaron Dunwoody
(74) Attorney, Agent, or Firm—Taylor & Aust, P.C.

(57) ABSTRACT

A conduit elbow assembly includes a hollow conduit piece having an end with an outer diameter, a body and a cap. The body has a first connective end with an end bore at the first connective end receiving the hollow conduit piece therein. A male fitting is located at the first connective end, the male fitting having an outer surface and an end which extends into the end bore. The outer surface of the male fitting has barbs which engage and retain the end of the hollow conduit piece thereon. The cap is attached ton the body and has a plurality of tapered projections, of which two are diametrically opposed to each other relative to the outer diameter of the hollow conduit piece. The two tapered projections form a wedge fit with the outer diameter of the hollow conduit piece.

12 Claims, 3 Drawing Sheets

LOW-PROFILE CONDUIT ELBOW

BACKGROUND OF THE INVENTION

1. Field of the Invention

The present invention relates to electrical assemblies, and, more particularly, to electrical conduit elbow assemblies.

2. Description of the Related Art

Conduit elbow assemblies are frequently used within conduit systems to allow the redirection of electrical wiring as needed. Such conduit systems are typically made of plastic components (i.e., polyvinyl chloride (PVC)), the components of which are interconnected by a variety of methods. Typically, mating female and male ends are used in such systems. Such mating ends may be screw threaded or glued together, while at other times, a force fit therebetween may be relied upon. In such instances, barbs may be supplied on the outer surface of the male member end to improve the force-fit connection. However, such a force-fit connection does not always prove to be sufficient and the mating ends may thus become dislodged from one another.

What is needed in the art is a connective system that utilizes the simplicity of a force-fit but provides a more durable connection between elements.

SUMMARY OF THE INVENTION

The present invention provides a conduit elbow including a cap having tapered projections with serrated or barbed inner surfaces that serve to wedge fit the conduit in the body/bore of the conduit elbow.

The invention comprises, in one form thereof, a conduit elbow assembly including a hollow conduit piece having an end with an outer diameter and a conduit elbow assembly, the conduit elbow assembly having a body and a cap. The body has a first connective end with an end bore thereat receiving the hollow conduit piece therein. A male fitting is located at the first connective end, the male fitting having an outer surface and an end which extends into the end bore. The outer surface of the male fitting has barbs which engage and retain the end of the hollow conduit piece thereon. The cap is attached to the body and has a plurality of tapered projections, of which two are diametrically opposed to each other relative to the outer diameter of the hollow conduit piece. These two tapered projections form a wedge fit with the outer diameter of the hollow conduit piece.

An advantage of the present invention is that such a conduit assembly offers a more secure fit than is possible in a system in which a male fitting having barbs on the outer surface thereof is relied upon solely to engage and retain an end of a hollow conduit piece thereon.

Another advantage is that the major components of the conduit assembly can be press fit or snap fit together, thereby simplifying and easing the assembly process.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
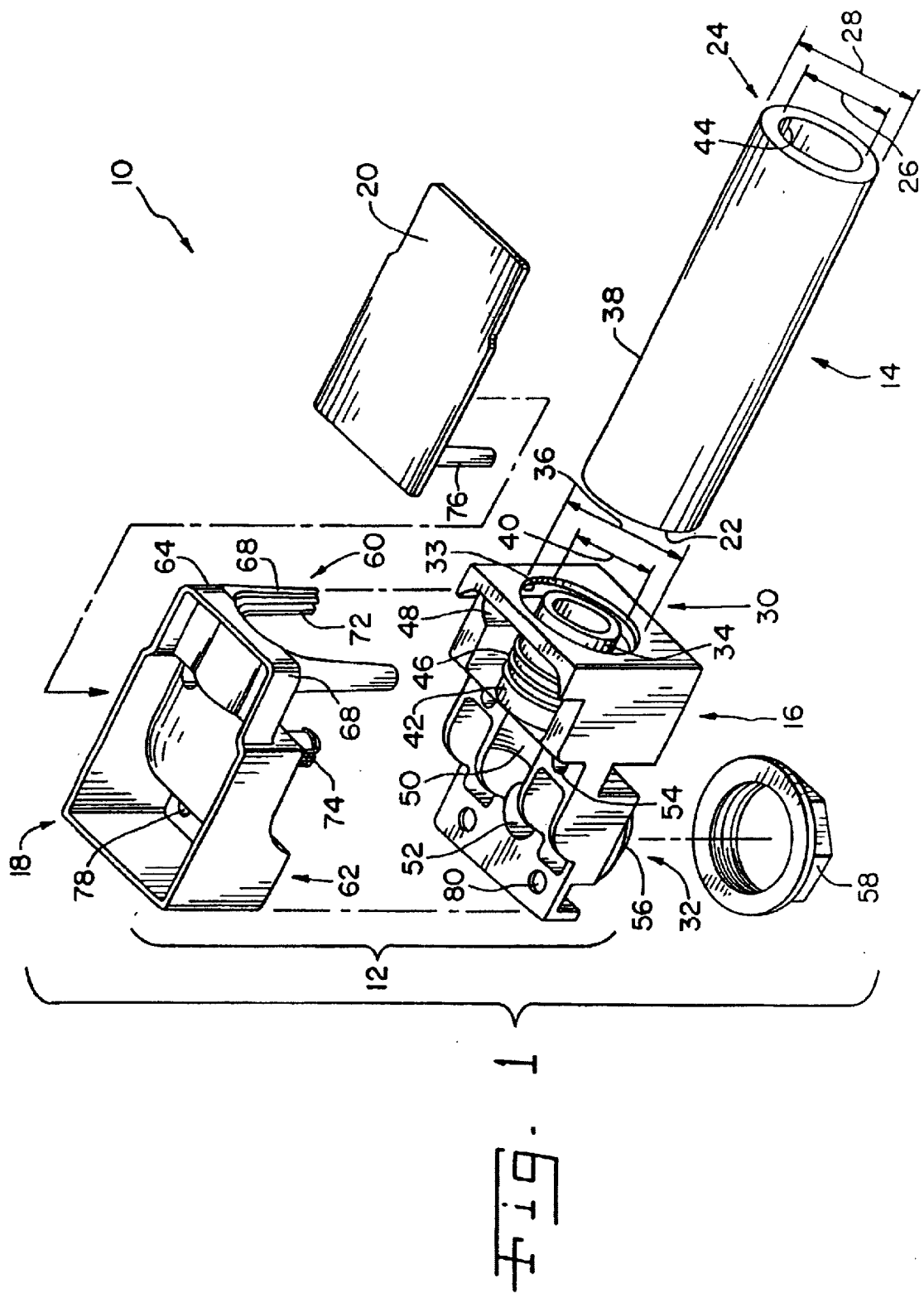
FIG. 1 s an exploded, perspective view of an embodiment of a conduit assembly of the present invention.

Referring now to the drawings, and more particularly to FIG. 1, there is shown a conduit assembly 10 which generally includes a conduit elbow 12 and a hollow conduit piece 14. Conduit elbow 12 includes a body 16, a cap 18 and a lid 20.

Hollow conduit piece 14 has a pair of ends 22 and 24. Hollow conduit piece 14 also has an inner diameter 26 and an outer diameter 28. Hollow conduit piece 14 is preferably made of plastic but could be made of metal or any other suitable material.

Body 16 of conduit elbow 12 has a first connective end 30 and a second connective end 32. First connective end 30 includes an end bore 33 within body 16 and a male fitting 34 mounted within body 16 and extending into end bore 33. End bore 33 has a diameter 36 which is sized to closely match outer diameter 28 of hollow conduit piece 14. As such, little or no clearance will exist between end bore 33 and outer surface 38 of hollow conduit piece 14.

Male fitting 34 has an outer diameter 40 that closely matches inner diameter 26 of hollow conduit piece 14, thereby providing little or no clearance between fitting surface 42 and inner surface 44 of hollow conduit piece 14. Furthermore, fitting surface 42 is provided with a plurality of barbs 46 thereon. Barbs 46 extend above and, preferably, around the circumference of fitting surface 42.

Body 16 has a pair of slots 48 formed therein proximate first connective end 30. One of slots 48 is located adjacent a first side of end bore 33, and the other slot 48 is adjacent a second side of end bore 33.

Body 16 is also provided with a channel to provide a connection between male fitting 34 at first connective end 30 with throughbore 52 formed in second connective end 32.

Positioned between first connective end 30 and second connective end 32 are a pair of central bores 54, one of each central bores 54 being located on either side of channel 50. The purpose of central bores 54 will be discussed later.

Second connective end 32 is preferably provided with a threaded portion 56 to allow second connective end 32 to be threadedly connected to another threaded fitting such as nut 58 or to a further conduit section (not shown) provided at least with internal threading at one of the ends thereof.

Cap 18 has a first extremity 60 and a second extremity 62. Mounted below and extending downwardly from each of corners 64 and 66 of first extremity 60 is a tapered projection 68. Each tapered projection 68 has an inner surface 70 (of which one is shown in FIG. 1). Each inner surface 70 is preferably provided with a series of barbs and/or serrations 72.

Between first extremity 60 and second extremity 62, cap 18 is further provided with at least one central projection 74, of which one is shown and two are preferable. Each central projection 74 is configured for forming a snap fit with a mating throughbore, central bore 54 in this instance.

Figure 2:
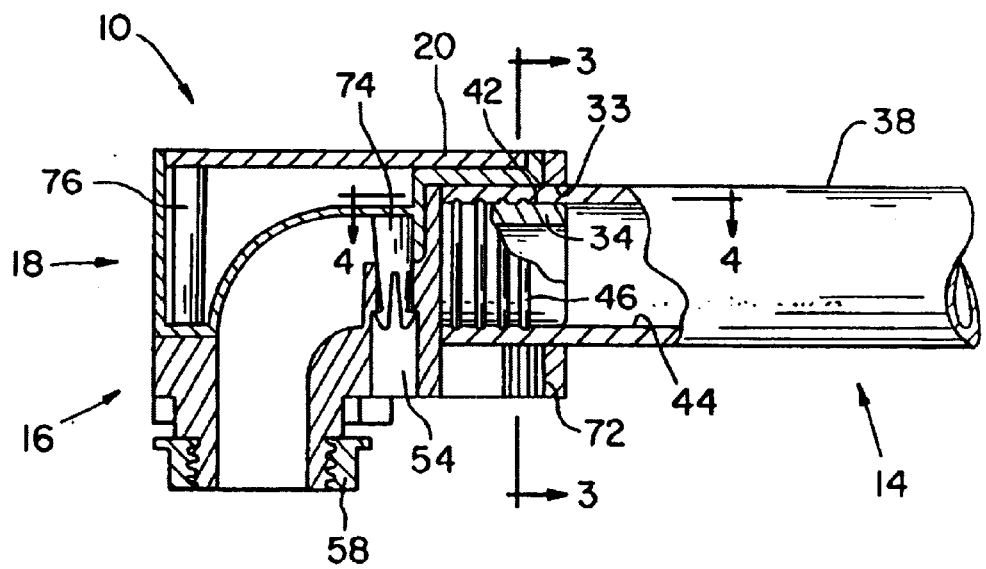
FIG. 2 is a sectional, assembled view of the conduit assembly shown in FIG. 1.
Figure 3:
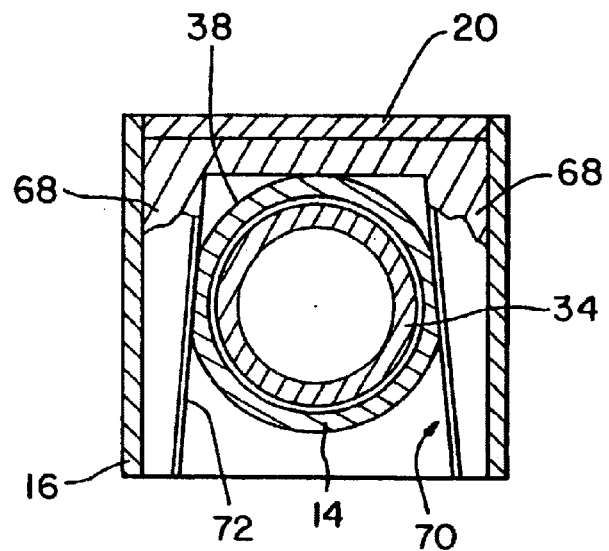
FIG. 3 is a cross-sectional view of the conduit assembly taken along line 3—3 as shown in FIG. 2.
Figure 4:
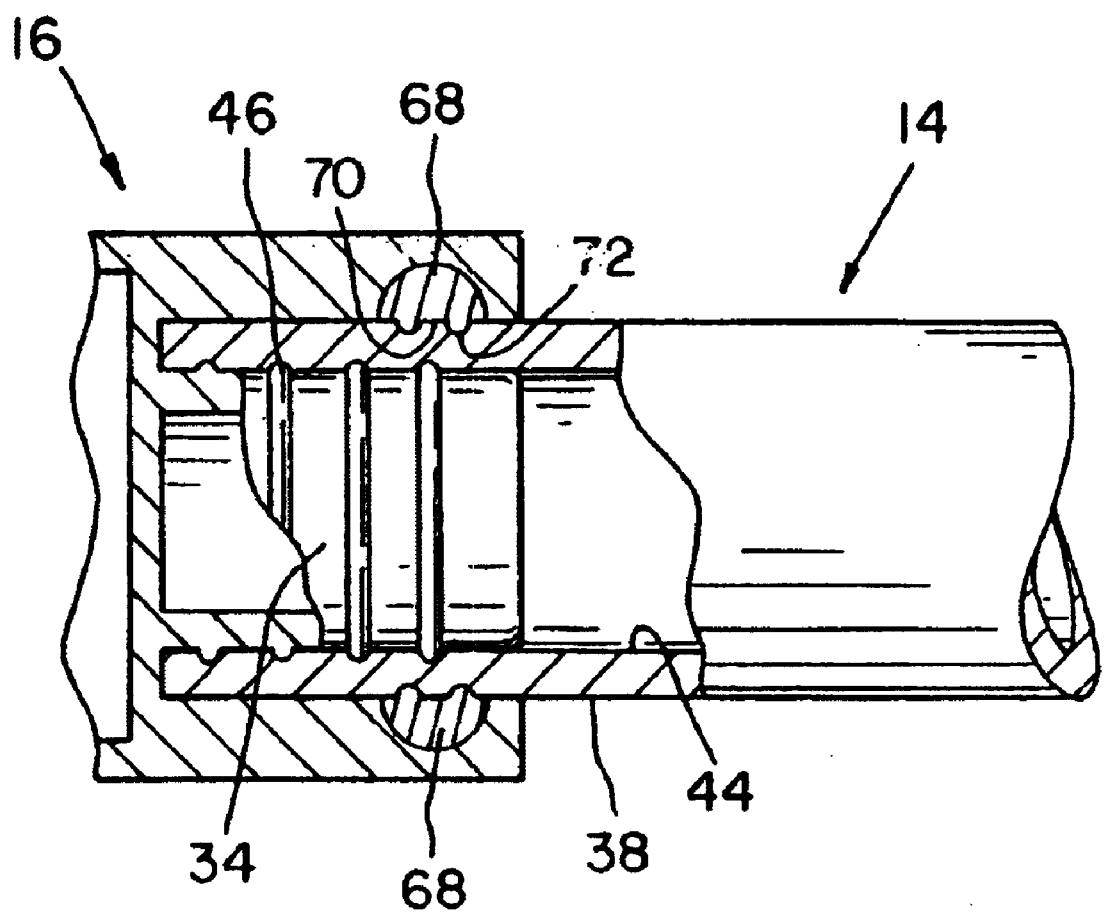
FIG. 4 is a cross-sectional view of the conduit assembly taken along line 4—4 as shown in FIG. 2.

FIGS. 2–4 show conduit assembly 10 in an assembled state. Hollow conduit piece 14 is held within end bore 33 and upon male fitting 34 by the combined action of barbs 46 on male fitting 34 and of tapered projections 68. As best seen in FIG. 4, barbs 46 form an interference fit with inner surface 44 of hollow conduit piece 14, thereby tending to lodge hollow conduit piece 14 upon male fitting 34. Furthermore, tapered projections 68 are essentially diametrically opposed relative to the outer diameter 28 of hollow conduit piece 14 and form a force fit with outer surface 38 of hollow conduit piece 14, as best seen in FIG. 3. Additionally, inner surface 70 of each of projections 68 is provided with barbs and/or serrations 72 thereon. Such barbs or serrations 72 form an interference fit with outer surface 38 of hollow conduit piece 14, as best illustrated in FIG. 4. The presence of tapered projections 68, and barbs and/or serrations 72, further ensure that hollow conduit piece 14 will remain positioned within end bore 33 and upon male fitting 34.

Each snap fit projection 74 of cap 18 provides a direct connection between cap 18 and body 16 by snapping within a corresponding central bore 54. Lid 20 is able to fit snuggly within the top of cap 18, thereby forming a flat upper surface for conduit elbow 12. To stabilize the position of lid 20 relative to cap 18 and body 16, lid 20 is preferably provided with at least one extension 76 which extends into a corresponding hole 78 within cap 18 and further into another corresponding hole 80 within body 16. Preferably, each extension 76 thereby forms a force fit with each of body 16 and cap 18.

Fitting or nut 58 is preferably connected to second connective end 32 via threaded portion 56. Nut 58 allows conduit elbow 12 to be coupled with other electrical components, such as an electrical box, etc.

Hollow conduit piece 14 is assembled with conduit assembly 10 in the following manner. End 22 or 24 of hollow conduit piece 14 is inserted into end bore 33 in first connective end 30 of body 12 and onto outer fitting surface 42 of male fitting 34 of body 12. At least a portion of barbs 46 provided on outer fitting surface 42 engage inner conduit surface 44 upon connection of lo male fitting 34 and hollow conduit piece 14. Cap 18 is then mounted upon body 12 and hollow conduit piece 14. Such mounting causes two tapered projections 68 of cap 18, which are diametrically opposed relative to outer diameter 28 of hollow conduit piece 14, to form a wedge-fit against outer conduit surface 38.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A conduit assembly, comprising:
   a hollow conduit piece having an end with an outer diameter; and
   a conduit elbow assembly comprising:
      a body having a first connective end, an end bore at said first connective end receiving said hollow conduit piece therein, a male fitting located at said first connective end, said male fitting having an outer surface and an end which extends into said end bore, said outer surface having barbs engaging and retaining said end of said hollow conduit piece thereon; and
      a cap attached to said body, said cap having a plurality of tapered projections, two said tapered projections being diametrically opposed to each other relative to said outer diameter of said hollow conduit piece, said two said tapered projections forming a wedge fit with said outer diameter of said hollow conduit piece.

2. The conduit assembly of claim 1, wherein said body has a pair of slots therein proximate said first connective end, said slots being diametrically opposed to each other relative to said outer diameter of said hollow conduit piece, each said slot having a corresponding said tapered projection inserted therein.

3. The conduit assembly of claim 1, wherein each said tapered projection has an inner surface, each said inner surface contacting said end of said hollow conduit piece, each said inner surface being provided with at least one of barbs and serrations thereon.

4. The conduit assembly of claim 1, wherein said body further includes a second connective end and a channel extending from said first connective end to said second connective end, said body having at least one central bore, each said central bore being located between said first connective end and said second connective end and adjacent to said channel, said cap further including at least one snap-fit projection, each said snap-fit projection being located between said first connective end and said second connective end, each said snap-fit projection snap-fitting with a corresponding central bore.

5. A conduit elbow assembly for connection to a hollow conduit piece, said conduit elbow assembly comprising:
   a body having a first connective end, an end bore at said first connective end configured for receiving the hollow conduit piece therein, said end bore having a bore diameter, a male fitting located at said first connective end, said male fitting having an outer surface and an end which extends into said end bore, said outer surface having barbs for engaging and retaining the hollow conduit piece thereon; and
   a cap attached to said body, said cap having a plurality of tapered projections, two said tapered projections being diametrically opposed to each other relative to said bore diameter, said two said tapered projections adapted to form a wedge fit with the hollow conduit piece received in said end bore.

6. The conduit elbow assembly of claim 5, wherein said body has a pair of slots therein proximate said first connective end, said slots being diametrically opposed to each other relative to said bore diameter, each said slot having a corresponding said tapered projection inserted therein.

7. The conduit elbow assembly of claim 5, wherein each said tapered projection has an inner surface, each said inner surface being adapted to contact the hollow conduit piece received in said end bore, said inner surfaces of said two said tapered projections facing one another, each said inner surface being provided with at least one of barbs and serrations thereon.

8. The conduit elbow assembly of claim 5, wherein said body further includes a second connective end and a channel extending from said first connective end to said second connective end, said body having at least one central bore, each said central bore being located between said first connective end and said second connective end and adjacent to said channel, said cap further including at least one snap-fit projection, each said snap-fit projection being located between said first connective end and said second connective end, each said snap-fit projection snap-fitting with a corresponding central bore.

9. A method of forming a conduit assembly, comprising the steps of:

providing a hollow conduit piece having an inner conduit surface, an outer conduit surface and an end;

providing a conduit elbow assembly including a body having a first connective end, an end bore at said first connective end, a male fitting located at said first connective end, said male fitting having an outer surface and an end which extends into said end bore, said outer surface having barbs thereon, and a cap having a plurality of tapered projections, two said tapered projections being diametrically opposed to each other relative to said end bore;

inserting said end of said hollow conduit piece in said end bore and onto said outer surface of said male fitting, at least a portion of said barbs engaging said inner conduit surface; and mounting said cap upon said body and said hollow conduit piece and thereby wedge-fitting said two said tapered projections against said outer conduit surface.

10. The conduit assembly forming method of claim 9, wherein said mounting step further includes the substeps of:

providing said body with a pair of slots therein proximate said first connective end, said slots being diametrically opposed to each other relative to said end bore; and receiving a corresponding said tapered projection in each said slot.

11. The conduit assembly forming method of claim 9, wherein each said tapered projection has an inner surface with at least one of barbs and serrations, each said inner surface contacting said hollow conduit piece upon performing said wedge-fitting.

12. The conduit assembly forming method of claim 9, further including the steps of:

providing said body with a second connective end and a channel extending from said first connective end to said second connective end;

providing said body with at least one central bore, each said central bore being located between said first connective end and said second connective end and adjacent to said channel;

providing said cap with at least one snap-fit projection, each said snap-fit projection being located between said first connective end and said second connective end, each said snap-fit projection mating with a corresponding central bore; and forming a snap fit between each said snap-fit projection and said central bore corresponding therewith, said step of forming said snap fit occurring concurrently with said mounting step.

\* \* \* \* \*